(No Model.)

J. N. WILSON.
PLANTER.

No. 535,433.

6 Sheets—Sheet 1.

Patented Mar. 12, 1895.

Witnesses,
E. F. Elmore
Frank D. Merchant

Inventor,
James N. Wilson
By his Attorney,
James P. Williamson (No Model.)  
J. N. WILSON.  
PLANTER.  
6 Sheets—Sheet 3.
No. 535,433. Patented Mar. 12, 1895.
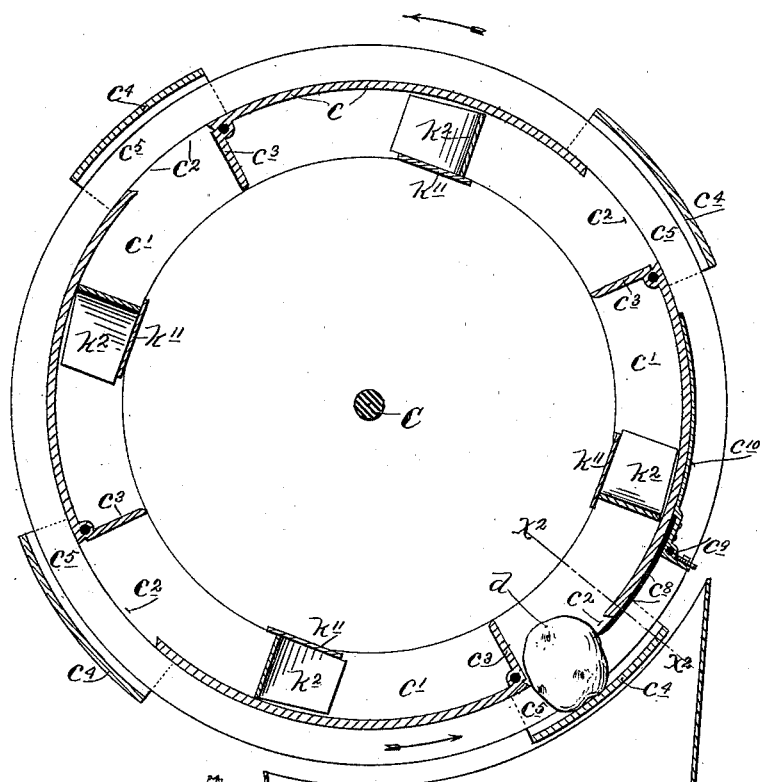
Fig. 3.
Fig. 4.
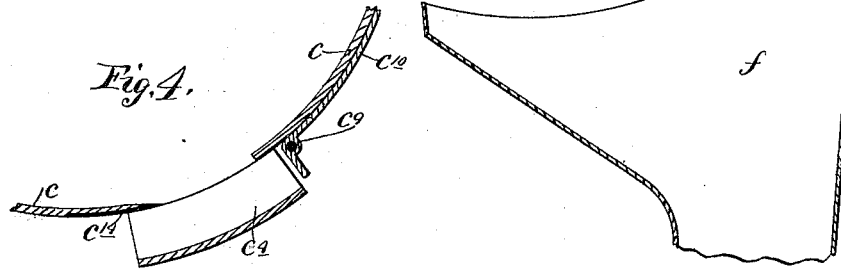
Witnesses.  
E. F. Elmore.  
Frank D. Merchant.
Inventor.  
James N. Wilson  
By his Attorney,  
Jas. F. Williamson.

(No Model.) 6 Sheets—Sheet 4.
J. N. WILSON.
PLANTER.
No. 535,433. Patented Mar. 12, 1895.
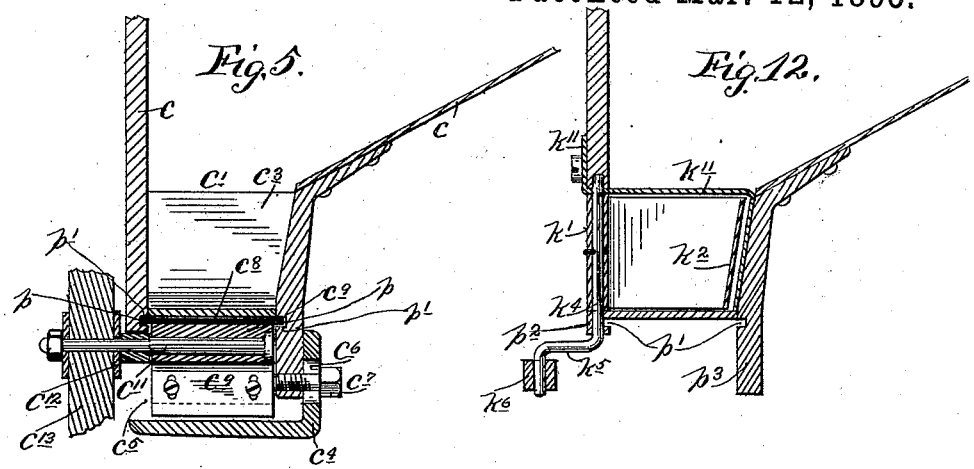
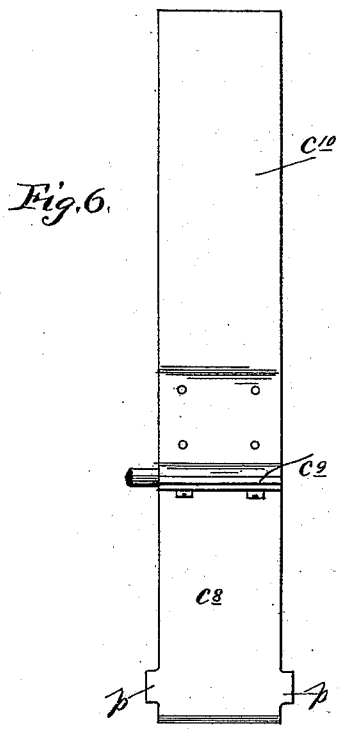
Witnesses.
E. F. Elmore
Frank D. Merchant
Inventor.
James N. Wilson
By his Attorney.
Jas. F. Williamson (No Model.)  
6 Sheets—Sheet 5.
J. N. WILSON.
PLANTER.
No. 535,433. Patented Mar. 12, 1895.
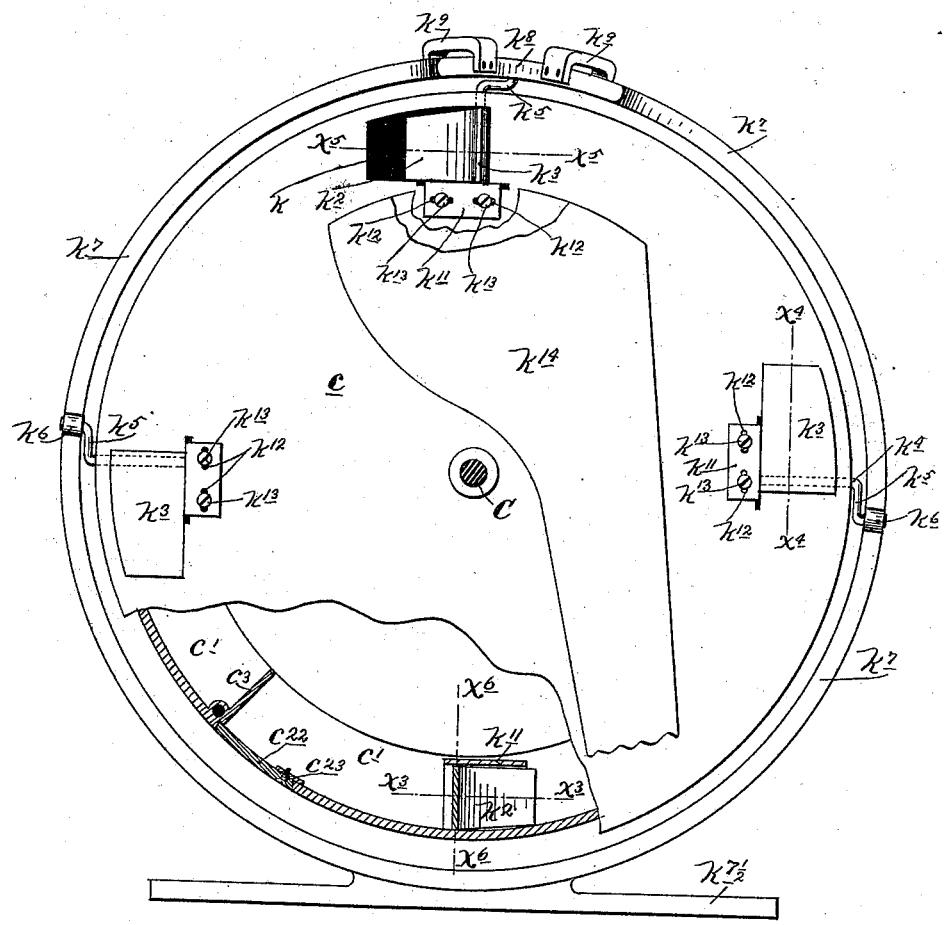
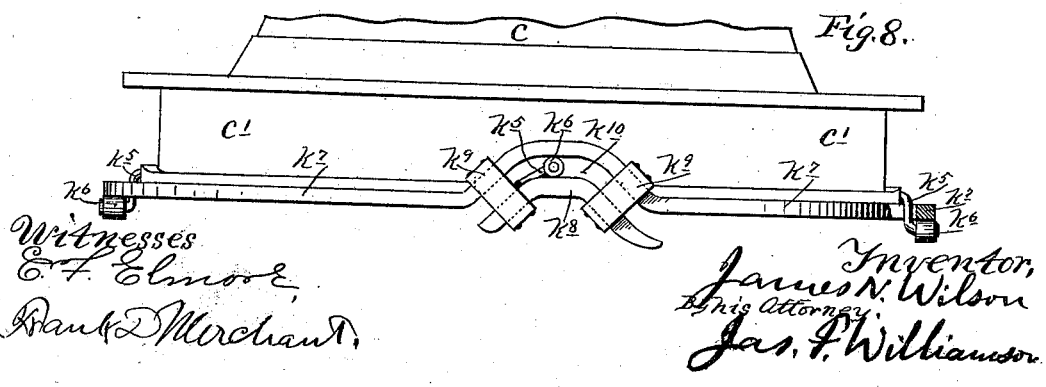
Witnesses  
E. F. Elmore  
Frank D. Merchant
Inventor  
James N. Wilson  
By his Attorney  
Jas. F. Williamson (No Model.)
J. N. WILSON.
PLANTER.
No. 535,433.
6 Sheets—Sheet 6.
Patented Mar. 12, 1895.
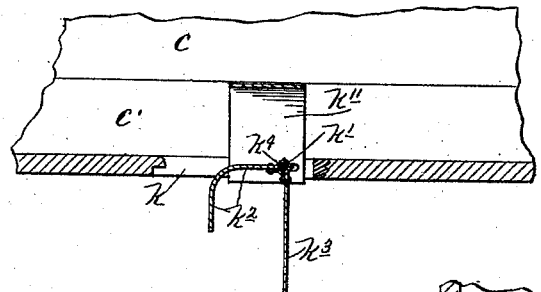
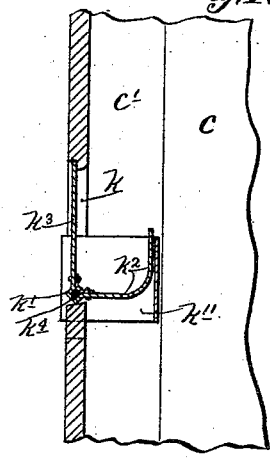
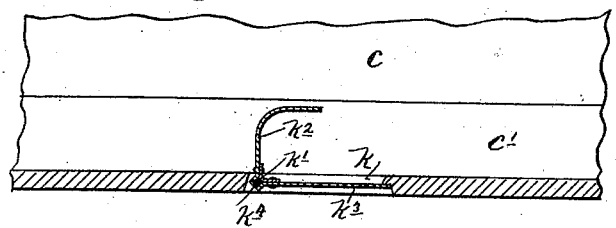
Witnesses,
E. F. Elmore
Frank D. Merchant
Inventor
James N. Wilson,
By his Attorney,
Jas. F. Williamson.
THE NORRIS PETERS CO., PHOTO-LITHO., WASHINGTON, D. C.

UNITED STATES PATENT OFFICE.

JAMES N. WILSON, OF MINNEAPOLIS, MINNESOTA.

PLANTER.

SPECIFICATION forming part of Letters Patent No. 535,433, dated March 12, 1895.

Application filed June 25, 1894. Serial No. 515,597. (No model.)

*To all whom it may concern:*

Be it known that I, JAMES N. WILSON, a citizen of the United States, residing at Minneapolis, in the county of Hennepin and State of Minnesota, have invented certain new and useful Improvements in Planters; and I do hereby declare the following to be a full, clear, and exact description of the invention, such as will enable others skilled in the art to which it appertains to make and use the same.

My invention relates to planters.

The machine, in its preferred form, is especially designed for use as a potato-planter, and is operative both to cut the potatoes and to plant the same suitably spaced apart in rows; and, in its modified form, the machine is adapted to plant potatoes without cutting, or as supplied to the machine, and to plant cotton, corn, peas, beans, and various other materials, in bunches. Otherwise stated, the machine herein shown, is organized with attachments interchangeably usable either for both cutting and planting potatoes, or for planting potatoes without cutting the same, or for planting various other kinds of materials.

To these ends, the invention consists of certain novel devices and combinations of devices, which will be hereinafter fully described and defined in the claims.

Figure 1:
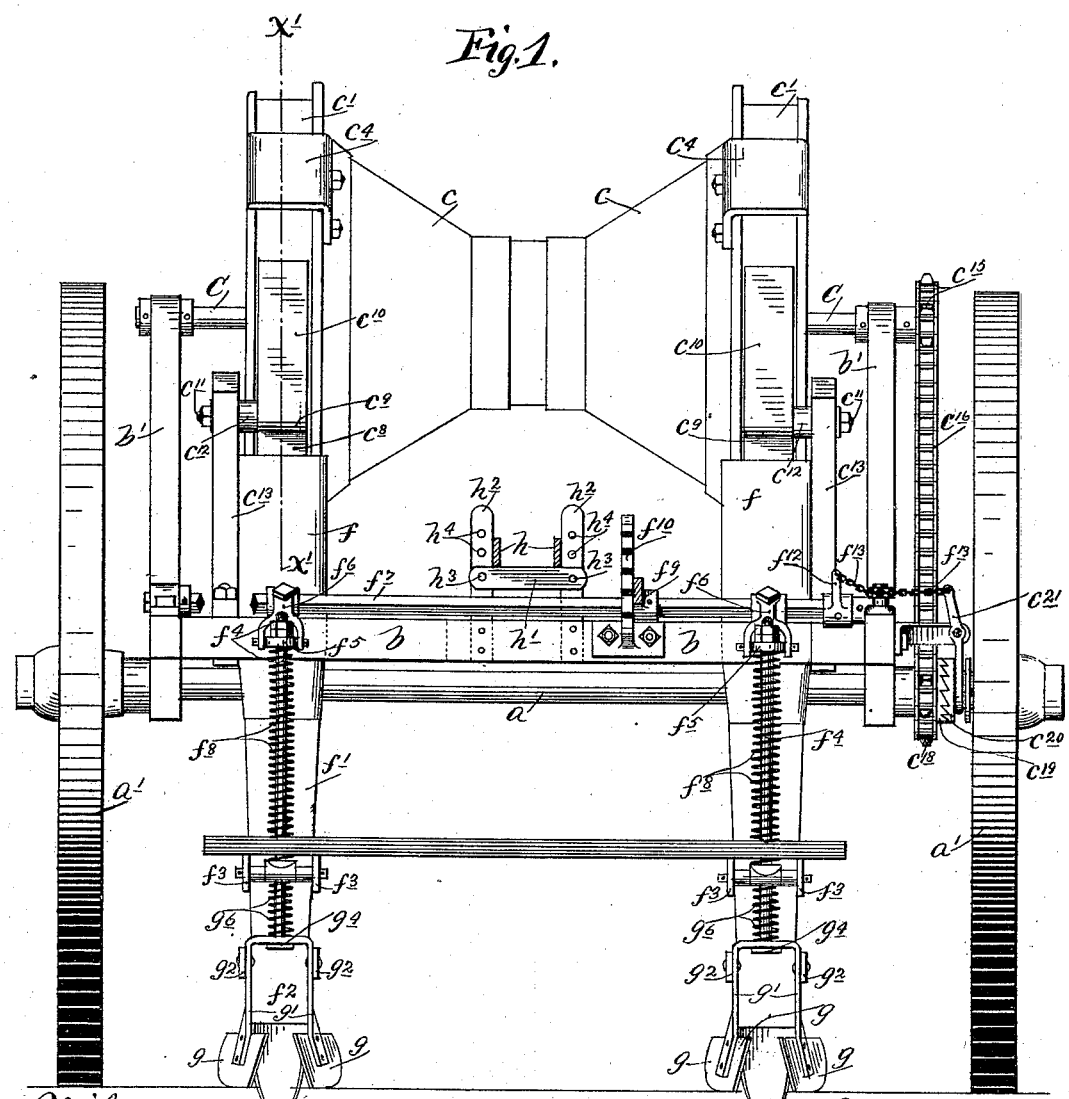
Figure 2:
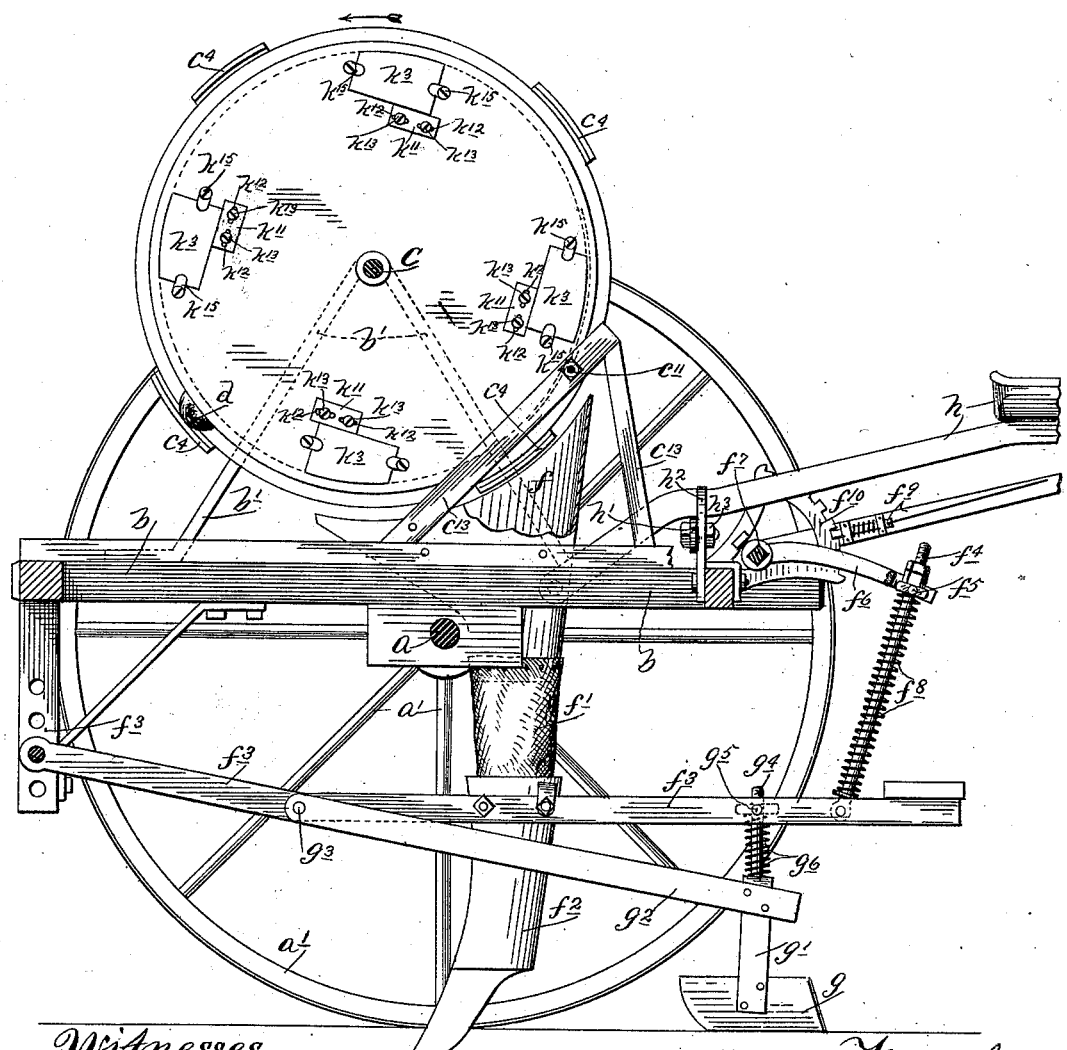

In the accompanying drawings, like letters referring to like parts,—Figure 1 is a rear elevation of the machine, with the cutting attachments in operative position. Fig. 2 is a left side elevation of the same, with the left supporting wheel removed, some parts shown in section and others broken away. Fig. 3 is a vertical cross section, through the drum and cutting attachments, on the line $X'$ $X'$ of Fig. 1. Fig. 4 is a detail, in section, on the same line as Fig. 3 through a modified form of the cutting device. Fig. 5 is a radial section, on the line $X^2$ $X^2$ of Fig. 3, with the said parts assumed to be in radial line with the abutment or bunting block, carried by the knife. Fig. 6 is a plan view of the knife and bunting block detached. Fig. 7 is an end view of the drum and fixed cam, chiefly in elevation, but partly in vertical section, with some parts broken away, showing the modification wherein the cutting attachments are removed or idle, and the pivoted droppers, together with the cam controlling the same in their operative positions, in respect to the drum. Fig. 8 is a plan view of the drum and cam, shown in Fig. 7, with some parts broken away. Fig. 9 is a detail of one of the pivoted droppers, in horizontal section, on the line $X^3$ $X^3$ of Fig. 7, showing the dropper in its closed and loading position. Fig. 10 is a detail of one of the pivoted droppers in vertical section, on the line $X^4$ $X^4$ of Fig. 7, looking radially inward and showing the dropper in its loaded and carrying position. Fig. 11 is a detail of one of the pivoted droppers in horizontal section, on the line $X^5$ $X^5$ of Fig. 7, showing the dropper in its dumping or dropping position. Fig. 12 is a radial section, on the line $X^6$ $X^6$ of Fig. 7, with some parts broken away, showing the relation of one of the pivoted hook-like droppers to the collecting trough of the drum and the adjustable plate which co-operates with the dropper.

On the axle $a$, supported by ground-wheels $a'$, is mounted the frame $b$, which is of any suitable construction and is provided with a pair of standards $b'$. In the said standards $b'$ is journaled the shaft C having attached thereto the sectional bi-coniform drum $c$ $c$, arranged with its large end outward and provided with enlarged cross sections adjacent to its outer end heads, which form internal annual collecting troughs $c'$, as clearly shown in Figs. 1, 5 and 12. These collecting troughs $c'$ have inclined inner walls, so as to render the same bell-mouthed at the point of their junction with the conical sections of the drum. In the peripheral walls of these collecting troughs $c'$ are located discharge openings $c^2$ of suitable size to permit the outward passage of the potatoes. At the rear margins of said openings or outlets $c^2$ are located radial shelves $c^3$ projecting inward. External of said outlets $c^2$ are located corresponding delivery guards $c^4$, which co-operate with the peripheral walls of said troughs $c'$, to form open ended delivery pockets $c^5$. The said guard-plates $c^4$ are of angular form, with their inner or radial portions secured, with freedom for radial adjustment, on the inner walls of said troughs and their axial portions projecting outward and overhanging the said outlets $c^2$. As shown, the said plates $c^4$ are provided with slots $c^6$, Fig. 5 through which work screw-bolts $c^7$, for securing the same to the drum, with freedom for the said radial adjustment. In virtue of this construction and arrangement of the said delivery guards, the said delivery pockets $c^5$ are not only open at each end, but are also open at their outer sides or at the end of the drum.

Located, one at each end of the drum, in the path of the pockets $c^5$, in their movement under the rotary motion of the drum, are supported, in the preferred construction, a pair of knives $c^8$ and corresponding abutments or banking blocks $c^9$ having attached thereto shields $c^{10}$. These parts $c^8$ $c^9$ $c^{10}$, of each cutting device, are supported by clamping-bolts $c^{11}$ and spacing collars $c^{12}$ extending into said pockets, parallel with the axis of said drum, and clamping the said parts $c^8$ $c^9$ $c^{10}$ to vertical standards $c^{13}$, rising from the main frame. The bunting blocks $c^9$ and the shields $c^{10}$ are necessary, in both constructions, shown in Figs. 3 and 4, but the knives $c^8$ instead of being attached to the fixed parts $c^9$ $c^{10}$, as shown in Fig. 3, may be applied to and carried by the drum, as shown at $c^{14}$ in Fig. 4; and in which modification the radial shelves $c^3$, shown in Fig. 3, would be dispensed with.

Rotary motion, in the direction shown by the arrows, is imparted to the drum by a sprocket and chain drive $c^{15}$ $c^{16}$ $c^{18}$, and a clutch, composed of the half member $c^{19}$ on the sprocket $c^{18}$ and the half member $c^{20}$, mounted to slide on the inner hub of the right hand driving wheel $a'$. The sprocket $c^{18}$ and both of the wheels $a'$ are loose on the axle $a$. The sliding half clutch $c^{20}$ is loose on its supporting hub and subject to the shipper-fork $c^{21}$, and is under spring tension to assume its closed position. Having regard to the action, the potatoes within the drum will of course, roll to the outer ends into the collecting troughs $c'$; and, under the rotary motion of the drum, the body of potatoes will roll over and over and tend to follow upward on the traverse line of the drum. In this action, the radial shelves $c^3$ will arrest the potatoes and cause the same to project through the opening $c^2$ into the delivery pocket $c^5$. If the potato is of the size to require cutting, such as the specimen shown at $d$, in Fig. 3, its outward movement will be arrested by the guard-plate $c^4$; and under the rotary motion of the drum, the potato will be carried forward and upward against the knife $c^8$. Hence, the projecting portion of the potato will be cut off by the knife and its further movement will be intercepted by the abutment or bunting block $c^9$; and hence, under the continued movement of the drum, the said outer portion of the potato will be forced from the back end of the pocket $c^5$ by the said abutment $c^9$ and will drop from the drum into a hopper-like chute $f$, whence it will be conducted through the seed-tube $f'$ and seed-boot $f^2$ to the seed trough or furrow, opened up thereby for the same, in the ground.

If the potatoes were so small as not to require cutting, or in other words, were of less size than the cross section of the pocket $c^5$, they would, of course, pass freely through the outlet $c^2$ of the drum; but would be intercepted by the guard-plates $c^4$; and in virtue of the centrifugal motion, would be carried forward in the pocket on the guard-plate, until it reached sufficient elevation to roll into the mouth of the hopper-chute $f$. Otherwise stated, the small potatoes will not escape from the openings $c^2$, until they reach proper dropping position over the receptacle $f$, as I have demonstrated by actual field tests with this machine. The shield $c^{10}$ must, however, be provided and be extended upward from the abutment block $c^9$, to a point above the level of the drum shaft $c$ and to a point beyond the highest traverse line of the potatoes with the drum; otherwise, the potatoes would roll out of the opening $c^2$, after it had passed the abutment $c^9$. By extending the shield $c^{10}$ to the point stated, the potatoes cannot escape, and before reaching the end of the shield, they will begin to roll radially down the drum, so that there is no danger of their escape beyond that point.

With the form of device shown in Fig. 4, the action would be exactly the same, with the exception that the cutting would be done by the knife $c^{14}$ carried on the drum against the abutment $c^9$, as a base of resistance. This form shown in Fig. 4, is less desirable, inasmuch as the radial shelf $c^3$ must be dispensed with, to permit the necessary movement of the inner cut portion of the potato; and hence, the potatoes may more easily roll backward down the troughs, without necessarily entering the outlet opening $c^2$. The form shown in Fig. 4, is therefore less reliable.

The seed-boots $f^2$ are carried by the drag-bars $f^3$, which have their forward ends pivoted to the brackets $f^{3\frac{1}{2}}$, depending from the main frame. The boot drag-bars $f^3$ are extended rearward of the boots, and are provided with spring guide-rods $f^4$, working freely through rocking keepers $f^5$, in the outer ends of crank-arms $f^6$ on the lever-shaft $f^7$. Springs $f^8$ encircle the rods $f^4$ between the keepers $f^5$ and the drag-bars. The lever-shaft $f^7$ has a spring pawl hand lever $f^9$, attached thereto, the pawl of which is engageable with a notched lock segment $f^{10}$, fixed to the main frame. Hence, the drag-bars $f^3$ and seed-boots $f^2$ may be set for any desired depth or raised out of the ground at will, by the hand-lever $f^9$. The spring $f^8$ will yieldingly apply the pressure to the drag in the seed-boot, and permit the same to rise, when necessary, to avoid breakage or pass an obstruction.

For covering purposes, I employ a pair of shovels $g$, set nearly vertical and convergent rearward. The said shovels $g$ are attached to a yoke $g'$, fixed to the rear ends of a two-arm drag $g^2$, which straddle the seed-boot $f^2$, and are pivoted to the drag $f^3$ at their forward ends, as shown at $g^3$. The yoke $g'$ is provided with a stem $g^4$, which extends upward through a passage in a rocking keeper $g^5$, pivoted in the boot-drag-bar $f^3$. On the rod $g^4$ is a spring $g^6$ reacting against the keeper $g^5$ and the yoke $g'$. This construction permits the shovel drag to yield independently of the boot-drag, while at the same time, it receives pressure from the spring $f^8$, identical with that on the boot-drag.

The lever shaft $f^7$ has at its right end an arm $f^{12}$ connected by chain $f^{13}$ with the shipper-fork $c^{21}$; and in virtue of this construction, the raising or lowering of the lever $f^9$ throws the drum in or out of gear with the driving wheel $a'$.

A suitable seat $h$ is supported from the main frame and is adjustable by raising or lowering the cross-bar $h'$ on the standards $h^2$ by the pins and holes $h^3$ $h^4$.

The drum sections telescope and the seed-boot and shovel-drags, together with all the other parts necessary for the purpose, are adjustable laterally, so as to adapt the machine for different widths of rows; but as the construction for this purpose is substantially identical with that shown in my prior patent, No. 518,979, dated May 1, 1894, it has not been deemed necessary for the purposes of this case to illustrate or describe the same.

Turning now to the interchangeable construction, for dropping the potatoes without cutting or planting other kinds of materials, such as cotton, corn, &c., the collecting troughs $c'$ of the drum, in addition to the parts already noted, are provided with openings $k$, in the end-walls thereof or the heads of the drum, adjacent to the periphery thereof, as shown in Figs. 7, 9, 10 and 11. In these openings $k$, are seated pivoted droppers, having pivot-shaft seats $k'$, hook-like portions $k^2$, and straight expanded portions $k^3$. The pivot-shaft seats $k'$ are of angular form, in cross section, and are fitted with pivot-shafts $k^4$ of corresponding shape, which are journaled in suitable bearings in the drum-head, and provided with crank-arms $k^5$, projecting outward of the drum and having, on their outer ends, rollers $k^6$, which bear against an annular cam $k^7$. The said cam $k^7$ has a foot plate $k^{7\frac{1}{2}}$, by means of which the cam is secured to the main frame $b$, in place of the standard $c^{13}$, which was used in the other construction, to support the parts $c^8$, $c^9$ and $c^{10}$. The cam $k^7$ acting on the lever-arms $k^5$, holds the pivoted droppers normally in their closed position, as shown in Figs. 9 and 10, with the hook-like portion $k^2$ projecting into the collecting troughs $c'$, and the straight expanded portions $k^3$ closing the outlet openings $k$ in the head of the drum; but the said cam $k^7$, has at or near its highest point, a jog formed therein, which is faced by an outside cam-plate $k^8$ of corresponding form, supported from the main cam $k^7$ by bracket-irons $k^9$, to form a cam-channel or passage $k^{10}$. Hence, when the rollers $k^6$ on the crank-arms $k^5$ reach the said passage $k^{10}$, the droppers will be turned on their pivotal bearings, so as to throw the same into the position shown in Fig. 11, and afterward, to restore the same to their normal position, as shown in Figs. 9 and 10.

To the drum-heads are secured adjustable plates $k^{11}$, which plates are of angular form and project inward through the openings $k$ into the collecting troughs $c'$, with their upturned or radial portions bearing against the inner walls of said troughs. These plates $k^{11}$ co-operate with the hook-like portions $k^2$ of the pivoted droppers, when the droppers are in their closed position, to form cups for receiving the potatoes or other materials to be dropped, and graduating the quantity of the same, under the motion of the drum from its loading to its dropping position. The said plates $k^{11}$ are adjustable on chords of the arcs in which they are located, so as to vary the size of the cups formed by the same in co-operation with the dropper-hooks $k^2$, when in their closed position. For effecting this adjustment, the outside flanges of said plates $k^{11}$ are provided with slots $k^{12}$, through which work set-screws $k^{13}$, engaging with the head of the drum.

Having regard to the action, the cups formed by the parts $k^2$ and $k^{11}$ will be loaded when at the lowest traverse line of their movement with the drum; and at this point, the plate $k^{11}$ will be the top wall of the cup. Under the continued movement of the drum, the plate $k^{11}$ will become vertical, when on the level with the axis of the drum. At or before reaching this point, the materials will have begun to have rolled back radially, from the collecting troughs toward the center of the drum; and, under the continued movement, everything will roll back, except what is held by the cups. When the cup reaches the vertical position, the plate $k^{11}$ will be horizontal and form the bottom wall of the cup. As this position is reached, the cam channel $k^{10}$ will become operative on the crank-arms $k^5$, to throw the pivoted droppers outward into their dumping or dropping position, as shown in Fig. 11. Hence, the hooks $k^2$ will carry with them the contents of the cup and drop the same outside the drum into a hopper-like chute $k^{14}$, which like the chute $f$, connects with the seed-tube $f'$, for directing the potato or other material to the seed-boot $f^2$ and the furrow opened thereby in the ground.

Having regard to the changes required for shifting from the use of the cutting attachments to the use of the pivoted droppers, the standard $c^{13}$, together with the parts $c^8$, $c^9$ and $c^{10}$ supported thereby, must of course be removed from the main frame, and the cam casting $k^7$ $k^8$ be substituted in proper position for the proper use thereof on the main frame; and the openings or outlets $c^2$ in the peripheral wall of the collecting troughs must be closed, which is done by removable plugs $c^{22}$, Fig. 7 fitting beveled seats in the wall of the drum, and provided with a pivoted latch button $c^{23}$, engageable with the inner edge of one of said walls on the margin of said opening $c^2$. When changing back to the cutter, the said plugs $c^{22}$ are removed, the said cam-casting $k^7$ $k^8$ is taken off and the said standards $c^{13}$ with the parts carried thereby substituted instead; and the pivoted droppers are locked in their closed positions by turn-buttons $k^{15}$ Fig. 2 carried on the drum-heads and engageable with the edges of the parts $k^3$ of said droppers. The hopper-like chutes $f$ and $k^{14}$ Fig. 7 must also be changed, when shifting from the one use to the other. This interchangeable construction is a great advantage, inasmuch as it gives a greatly increased range of work for the machine. The cutting attachments are of course only desirable, where it is necessary to cut some or all of the potatoes. The pivoted droppers on the other hand, are capable of planting potatoes, as supplied to the drum, whether cut or uncut, and are also capable of planting a great variety of other things, such as cotton-seed, corn, peas, beans, &c. The machine with the pivoted droppers is especially well adapted for planting cotton-seed in bunches. The drum sections $c$ $c$, are, of course, provided with suitable doors (not shown) for the introduction of the materials thereto.

The fact that the drum sections are coniform and terminate at their outer ends, in the annular collecting troughs $c'$, of radially flaring form in cross section, greatly assists in insuring the positive action of the dropping and cutting attachments. In virtue of the fact that the said troughs, are wider at their junction, with the conical sections of the drum, than they are at their bottoms or peripheral walls thereof, prevents any clogging of the potatoes or other materials on the walls of the said trough. In both forms of these devices, the separation of the body of potatoes or other materials in the drum from the particular potato or portion, which is to be cut or dropped, is very largely what might be called a natural one, under the rotary motion of the drum; or otherwise stated, the particular part is held and the others are rolled away therefrom, under the motion of the drum.

The pivoted droppers herein shown and described, could readily be made to also cut the potato by forming the hook-like portions $k^2$ with knife-edges, and setting a shear edge knife-plate in the openings $k$, for co-operation with the said hooks $k^2$, when turned outward into their dropping position. The said shear edge plates would be adjustable in the openings $k$, so as to leave passages of the proper size and insure the meeting of the hooks and the edges of said plates on the proper lines or angles.

Analysis of the mechanism herein shown and described for effecting the cutting and dropping of the potatoes, will show that the gist of the construction or the principle involved consists in a feed receptacle of some kind, having an outlet opening, an external guard or shield co-operating with the receptacle to form an open ended pocket opposite the outlet, a bunting block or abutment, which passes through said pocket in the action of the parts, a knife co-operating with the said bunting block and receptacle, and means for producing a relative motion of the receptacle and abutment, in order to effect the passage of the abutment through said pocket. As shown, the receptacle moves, but it must be obvious that the same result would follow if the abutment moved, instead of the receptacle.

The drum with the collecting troughs $c'$ and the pivoted droppers $k'$ $k^2$ $k^3$ with the other necessary co-operating parts are shown described and claimed in a companion case, filed by me of even date herewith, under Serial No. 515,596. They have been shown in this case, simply to illustrate a preferred form of interchangeable attachment, for use with the general machine having the cutting attachments, which are herein claimed.

It should be noted that the knife $c^8$ is provided with side lugs $p$, Fig. 5 which run in grooves $p'$, one of which is formed in a projecting flange $p^2$ of the drum head and the other of which is formed in projecting flange $p^3$ of the inner walls of the collecting troughs $c'$. The said grooves $p'$ form guides for the said knife lugs $p$ and serve to hold the knife $c^8$ to its work and prevent the same from yielding outward in the cutting action by the wedging of potatoes between the knife and the drum.

What I claim, and desire to secure by Letters Patent of the United States, is as follows:

1. A potato-planter, comprising a feed receptacle having an outlet opening, a guard or shield external of said outlet and cooperating with the receptacle to form an open ended delivery pocket, an abutment or bunting block, which passes through said pocket, in the action of the parts, a knife cooperating with said abutment and receptacle to cut the potato, and means for producing a relative movement of the receptacle and abutment in respect to each other, for effecting the passage of said abutment through said pocket and producing the relative action of the different parts, substantially as described.

2. In a potato planter the combination with a feed receptacle having an outlet opening, of a guard or shield external of said outlet, and cooperating with said receptacle to form an open ended delivery pocket, an abutment which passes through said pocket, in the action of the parts, and a knife carried by said abutment, with the blade or cutting end thereof in advance of the abutment, and of a length greater than the thickness of the largest potato, which is expected to be cut, and means for imparting motion to the receptacle or the abutment, for producing the action of the parts, substantially as described.

3. In a potato planter, the combination with a rotary drum having outlet openings for the potatoes, of delivery guards carried by the drum external of said outlets and cooperating with the wall of the drum to form open ended delivery pockets, a fixed abutment or bunting block in the path of said pockets, and a knife cooperating with said abutment and drum, to cut off the projecting parts of the potatoes and force the same from said pockets, under the rotary motion of the drum, substantially as described.

4. In a potato planter, the combination with a rotary drum having outlets for the potatoes, of guards carried by the drum external of said outlets and cooperating with the wall of the drum to form open ended delivery pockets, a fixed knife and an abutment in the path of said pocket, for cutting off the projecting parts of the potatoes and forcing the same from said pockets, substantially as described.

5. In a potato planter, the combination with a rotary drum having outlets for the potatoes, and upwardly projecting radial shelves directly behind said outlets, of guards carried by said drum external of said outlets and cooperating with the wall of the drum to form delivery pockets, a fixed knife and an abutment in the path of said pocket, under the rotary motion of the drum, substantially as and for the purposes set forth.

6. In a potato planter, the combination with a rotary drum having outlets for the potatoes, of guards carried by the drum, external of said outlets, cooperating with the wall of the drum to form open ended delivery pockets, an abutment in the path of said pocket, a knife cooperating with said abutment to cut off the projecting part of the potato and force the same from said delivery pocket, and a shield extending from said abutment and operating to close said openings, after they pass said abutment, substantially as described.

7. A planter, comprising a rotary drum and interchangeable attachments, for cooperation therewith, one set of which is adapted both to cut and to drop potatoes and the other of which is adapted to drop the potatoes without cutting the same or to drop cotton seed, corn, &c. in bunches.

8. A planter equipped with a rotary bi-coniform drum and attachments, for interchangeably adapting the machine either to cut and drop potatoes, or to drop the same or other material without cutting, comprising a series of pivoted droppers in the end walls of the drum securable either in idle or operative position, a series of outlet openings in the peripheral wall of the drum, corresponding internal radial shelves behind the same, guards carried by the drum external of said outlet openings and cooperating with the wall of the drum to form open ended delivery pockets, a fixed knife abutment and shield applicable to the machine in the path of said pockets, plugs for said peripheral outlets, and an annular cam applicable to the machine for cooperation with said pivoted dropper, when active, substantially as described.

9. In a planter, the combination with the seed foot drags $f^3$ having guide rods $f^4$, of a lifting lever shaft $f^7$ having arms $f^6$ through which said rods work, a lock for the lifting lever, the spring $f^8$, the cover drags $g^2$ having the stems $g^4$ working through the boot drags and the spring $g^6$, all arranged and operating substantially as and for the purposes set forth.

In testimony whereof I affix my signature in presence of two witnesses.

JAMES N. WILSON.

Witnesses:
JAS. F. WILLIAMSON,
E. F. ELMORE.